United States Patent [19]

Loewenthal et al.

[11] Patent Number: 4,796,202

[45] Date of Patent: Jan. 3, 1989

[54] SPEEDING MAPPING OF PRINT CHARACTERS IN A MICROPROCESSOR CONTROLLED BANK PRINTER

[75] Inventors: Werner Loewenthal, North Hollywood; Patrick N. Leung, Canoga Park; Yuen W. Wong, Glendale, all of Calif.

[73] Assignee: Dataproducts Corporation, Woodland Hills, Calif.

[21] Appl. No.: 859,064

[22] Filed: May 2, 1986

[51] Int. Cl.$^4$ .................................. G06F 3/12
[52] U.S. Cl. ................... 364/519; 101/93.09
[58] Field of Search ............ 364/519; 101/93.08, 101/93.09; 400/70

[56] References Cited

U.S. PATENT DOCUMENTS

| | | | |
|---|---|---|---|
| 3,861,301 | 1/1975 | DiMarzio et al. | 101/93.08 |
| 4,091,911 | 5/1978 | Chang et al. | 364/519 X |
| 4,679,169 | 7/1987 | de laSalle et al. | 364/519 X |
| 4,683,818 | 8/1987 | Hewlett, Jr. | 101/93.09 X |

FOREIGN PATENT DOCUMENTS

| | | |
|---|---|---|
| A20033153 | 8/1981 | European Pat. Off. |
| A20033069 | 8/1981 | European Pat. Off. |
| A10071661 | 2/1983 | European Pat. Off. |
| 1345805 | 2/1974 | United Kingdom |
| 1427463 | 3/1976 | United Kingdom |

Primary Examiner—Gary V. Harkcom
Assistant Examiner—H. R. Herndon
Attorney, Agent, or Firm—Spensley Horn Jubas & Lubitz

[57] ABSTRACT

Four microprocessors type Intel 8051 collectively map one print buffer containing 136 ASCII character codes, each of a nominal 64 different types, into the control of 136 print hammers at an associated 136 columnar print positions. The print hammers are controlled to fire upon a selected one scan time interval of 690 microseconds, one of a total of 67 such scan time intervals within a 46.7 millisecond print time period. Print hammers are controlled to fire at a particular scan time interval in order to print a character from a then oppositely juxtaposed character font upon a circulating print band. The mapping being too time consuming to be done entirely within the print time period and within each of the scan time intervals, the microprocessors instead assign, during a 20 millisecond paper feed period prior to the print time period, a scan time value to each character code, which value corresponds to that one future scan time interval at which the print band character font corresponding to each character code will appear at that print position wherein the character corresponding to the character code is to be printed. Later, during each successive scan time interval, all stored scan time values are compared to the current scan time interval number. Print hammers at all print positions comparing equal are fired, printing after all scan time intervals a complete print line.

11 Claims, 6 Drawing Sheets

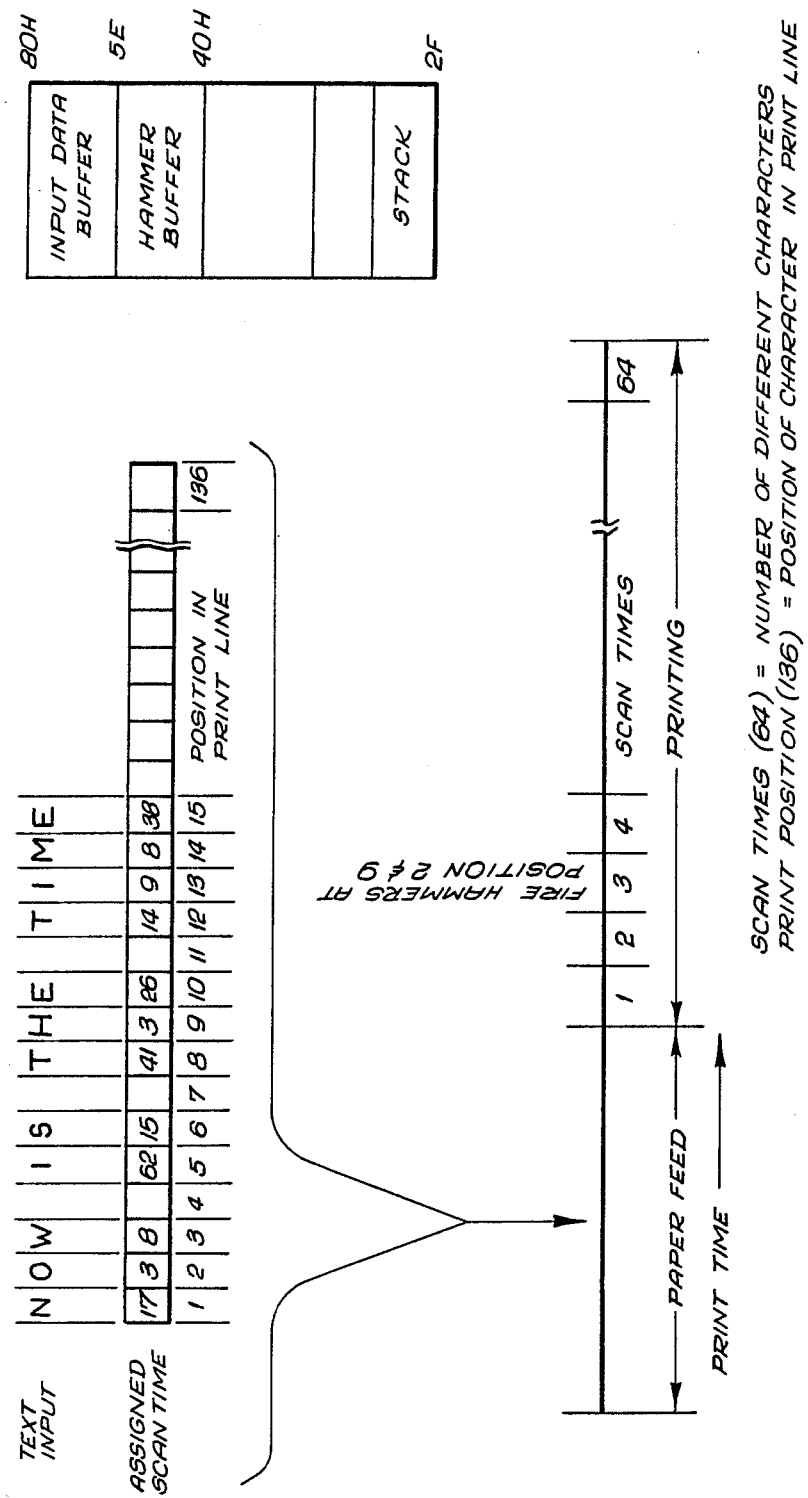

SPEEDING MAPPING OF PRINT CHARACTERS IN A MICROPROCESSOR CONTROLLED BAND PRINTER

BACKGROUND OF THE INVENTION

1. Field of the Invention

The present invention is generally concerned with microprocessor controlled band printers. The present invention is particularly concerned with speeding the mapping of print characters, normally received as ASCII codes, into the discreet control of the print hammers at the print positions which will allow a line of characters to be printed.

2. Description of the Prior Art

The principles and construction of band, or chain, printers are well known in the art. Such printers function to (1) receive data over an interface, nominally a digital interface, (2) to use dedicated hardware to store and to compare such data, mapping it into the required control of print hammers, and (3) to actuate print hammers against the printable characters upon the circulating print band in order to print a line, and (4) advancing a paper form between printing of each line. In detail, data is received over the interface, normally from a computer, and stored in a line buffer. During printing, the character band, or chain, turns in front of the hammer bank. The hammer bank typically has one hammer per print position, but may use one hammer for multiple print positions. Dedicated band printer logic keeps track of which character is in front of every hammer, a given set of characters being at the print station for a character time. A character time is a function of the speed of the band and the distance between characters on the band. During printing, the dedicated print logic checks, during each character time, the contents of the line buffer against the current character at each print station. For those characters which compare, the corresponding print hammer is enabled to effectuate printing. Normally the character codes within the line buffers of characters printed are deleted from the buffer upon such printing. The process then continues until all characters for the line are printed, which is shown by no remaining characters being the print buffer. The dedicated logic controls that the paper form should advance between lines which are printed.

The use of dedicated logic to control a band printer, and to map characters received upon an interface into the discreet control of the print hammers, is effective and has been used to control printers ranging in speed to several thousand lines per minute. The disadvantage of discreet, dedicated, band printer control logics are that such logics require a large amount of hardware to implement, and no standard large scale, or very large scale, integrated circuits exist to perform this band printer control function. The large amount of hardware used in implementation of dedicated band printer control logics require large board space and large power supplies, resulting in expensive implementation.

An improved prior art implementation of the control logics for a band, or chain, printer is based on the use of low cost microprocessor chips to control the printing process. The microprocessor is, however, generally too slow to perform the mapping of print data when (1) large numbers of columnar positions, (2) large numbers of different printable characters, and (3) high print speeds are involved. Recognize that at 600 lines per minute (1 pm) a line of print is completed each 100 milliseconds (100 msec), and at 900 lines per minute a line of print is completed approximately each 66.7 milliseconds. Of this time period, 25 milliseconds is normally used for paper feed in a 600 lpm printer and 20 milliseconds for paper feed in a 900 lpm printer. Within the remaining time for printing, respectively 75 milliseconds for a 600 lpm printer and 46.7 milliseconds for a 900 lpm printer, the complete character set, nominally 64 characters, must be printed. When synchronization pulses, nominally three in number, are added to the 64 character times, each such character time may be as short as 75 msec divided by 67 equals 1.2 msec for a 600 lpm printer, or 46.7 msec divided by 67 equal 690 microseconds for a 900 lpm printer. Recognize that the microprocessor printer logic must check, during each of these millisecond length or shorter character times, the content of the complete line buffer against the current character at each print station.

The continuing prior art improvement, and solution, to the problem of allowing microprocessors to perform, at millisecond speed, the required mapping of input characters to control of hammers at each print position within a band printer has been by the use of multiple microprocessors in parallel to perform this print character mapping function. The task of comparing, and mapping, the print information for all the print positions may then be divided by the number of parallel microprocessors used. In one prior art implementation of a 136 column, 600 line per minute printer, four microprocessors were used with each microprocessor controlling, and performing the print mapping, for 34 columns (34 print hammers). However, performance of the print mapping algorithm for the control of even this modest number (34) of columns becomes unworkable, at least for certain commonly available low cost microprocessors, at a print speed of 900 lines per minute. Of course, either (1) more microprocessors could continue to be used in parallel, or (2) expensive faster miroprocessors could be used, and/or (3) expensive chips normally associated with signal processing could be used. However, with the aim of holding down the cost of implementation of the microprocessor-based control logics of a band printer, an improvement to the algorithm, and performance, of the mapping of print characters into the control of the hammer positions is a desired solution, should such be realizable. With such an improved, algorithmically-based, solution to the more expedient mapping of print characters in a microprocessor controlled band printer the present invention is concerned.

SUMMARY OF THE INVENTION

The present invention is an improved method applicable only to microprocessor-controlled band printers, or other line-at-a-time printers wherein print character codes must be mapped to control of actuation of printing elements, such as hammers, at selected times during the printing cycle. The method of the present invention is entirely implemented upon a conventional band printer apparatus having a line buffer for storing print character codes corresponding to print positions, print hammers defining print positions upon a line which will be printed, a print band circulating printable characters through such print positions, a mechanism for advancing a workpiece paper form, and a microprocessor for controlling all such line buffer, print hammers, print band and mechanism for advancing paper in order to repetitively effectuate line-at-a-time printing. The present invention avails itself of the normal condition that there is a time interval, called a paper feed time, during which the microprocessor does control the mechanism for advancing the workpiece paper form, and during which time such form is advanced. Because of the mechanical activity involved, this period is of a substantial percentage of the overall print time, occupying 20 milliseconds of the total 66.7 millisecond period to print each line in a 900 line-per-minute printer. In the prior art the entire process of mapping the characters to be printed to control the print hammers at the print positions was done during a time interval, called a print time, following such paper feed time.

The improved method of the present invention is concerned with dividing that print mapping algorithm previously entirely performed during the second, print, time interval into an equivalent algorithmic operation divided to occur both within the first, paper feed, time interval and within the second, print, time interval. By performing the function of the mapping of print characters during two phases the present invention allows a fewer number of microprocessors to suffice for control of a line printer operating with a fixed number of print positions, a fixed character set, and at a fixed speed.

In particular, in the paper feed time before the printing of each line and during the feeding of the workpiece paper form, the microprocessor does, in knowledge of (1) the sequence of characters upon the print band and of (2) the single character of the print band first appearing at each print position upon the start of print, compute from the character code stored within the print buffer the scan, or print cycle, number at which each character of the print band which is to be printed will appear at that print position wherein it is to be so printed. These calculated scan, or print cycle, numbers are emplaced back in the line buffer in substitution for the character codes from which they are calculated. This preprocessing incurring entirely during the paper feed interval much simplifies the remaining processing which needs be conducted during the actual print time interval. Upon each successive scan, or print, cycle of printing the microprocessor will know the number of such cycle. It will simply search the stored scan numbers, identifying those which are equivalent to the current cycle, and cause actuation of the associated hammers in order to print the associated positions.

Correspondingly, the object of the present invention is to use fewer and cheaper (slower) microprocessors to perform the mapping of received print characters into the control of hammer actuations at the multiple print positions of a band printer. The invention accomplishes this by using a new and improved algorithm for the mapping of print characters, such algorithm particularly being accomplished both during the time of printing and during the prior, paper feed, time. Through performing such algorithm during a longer time, a more limited number of, or slower, microprocessors can accomplish equivalent work as would be required larger numbers of, or faster, microprocessors or signal processors in implementation of the prior art algorithm for the mapping of print characters.

BRIEF DESCRIPTION OF THE DRAWINGS

FIG. 6 shows a diagrammatic representation of the allocation of the line buffer memory, which allocation is useful to understanding references made by the microcode within Appendices A and B.

FIG. 7 shows a summary diagrammatic representation of the operation of the present invention.

DESCRIPTION OF THE PREFERRED EMBODIMENT

The present invention is an improved algorithmic method implemented in a microprocessor-controlled band printer.

Figure 1:
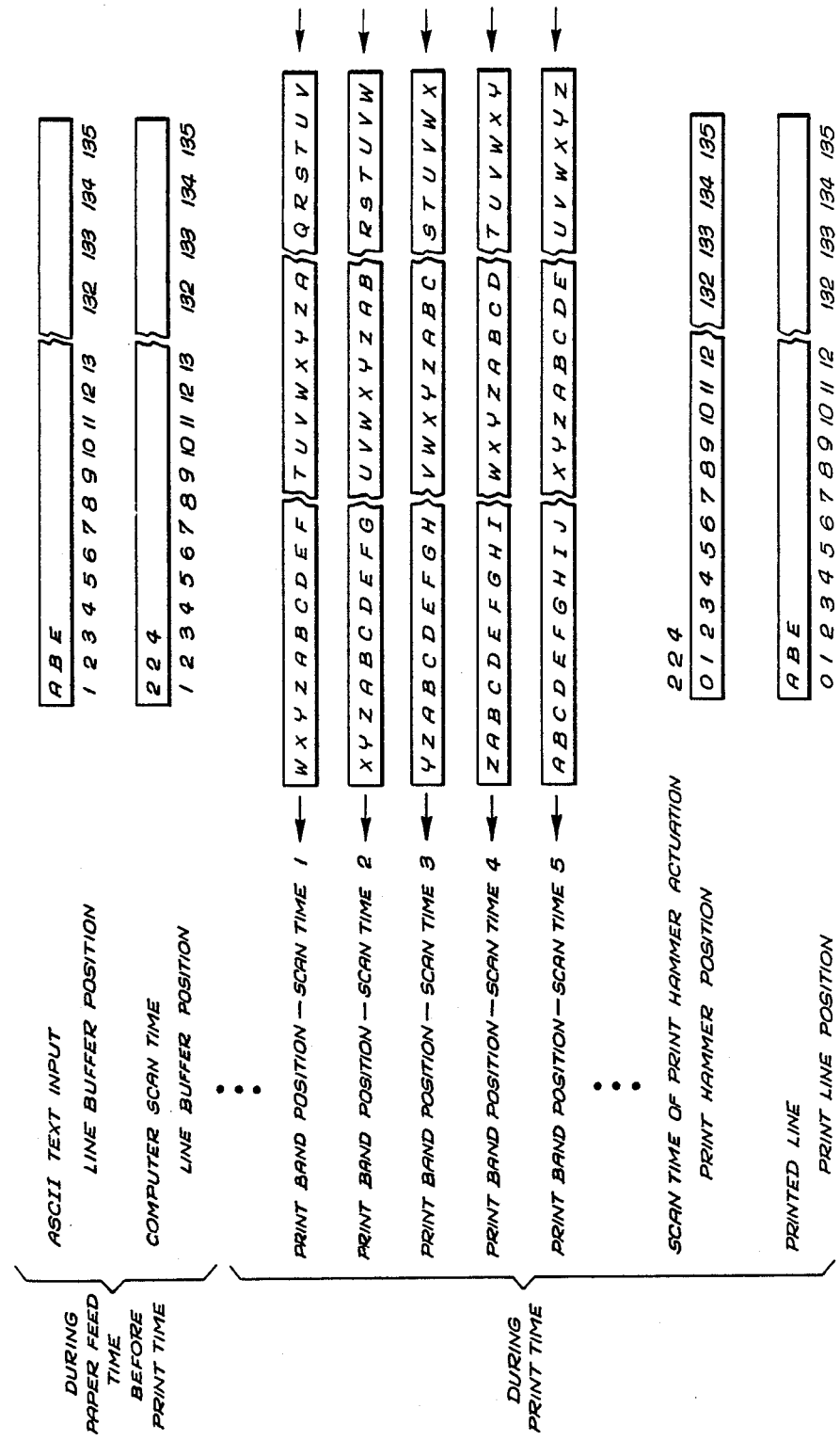
FIG. 1 shows a simplified example of the application of the improved algorithmic method of the present invention.

A simplified example of the application of the method of the present invention is shown in FIG. 1. The printer receives a printable line, shown to be the message "ABE", as print characters (nominally in ASCII) for each of the print positions (nominally 136). In knowledge of the sequence of characters upon the print band (the alphabet A to Z in capitals a repetitive number of times), and of the character which will be in *each* print position upon the *first* print scan time (e.g., "2" in print position 1, "A" in print position 2, etc.) a microprocessor computes the number of that future print scan time upon which each character desired to be printed will be positioned by the circulating print band at each corresponding print position. For example in FIG. 1, the scan times calculated to print the message "ABE" in print positions 1 through 3 are print scan times 2,2, and 4. These computed scan times are stored back into the line buffer at each corresponding print position. Notice in FIG. 1 that this entire operation of calculating and storing is accomplished "DURING PAPER FEED TIME BEFORE PRINT TIME".

Later, "DURING PRINT TIME", the circulating print band will emplace printable characters opposite each print position upon consecutive scan times as illustrated. The microprocessor will upon each scan time read all the computed scan times stored in all the addresses of the line buffer corresponding to all the print positions. When a match between the current and any stored scan time is made, then the print hammer of the corresponding print position will be actuated. Thus it is illustrated in FIG. 1 that the print hammers at print positions 0,1, and 2 will be respectively actuated at scan times 2, 2, and 4. By comparison to the printable characters upon the print band positioned oppositely the print hammers at the scan times 2, 2, and 4, it may be observed in FIG. 1 that the desired line "ABE" will be printed. The same principle of the method will, of course, be operative for more sophisticated and/or differing (1) numbers of print positions, (2) printable alphabets, (3) sequences of, and first character occurrences upon, the print band, and/or (4) longer length messages.

Figure 2:
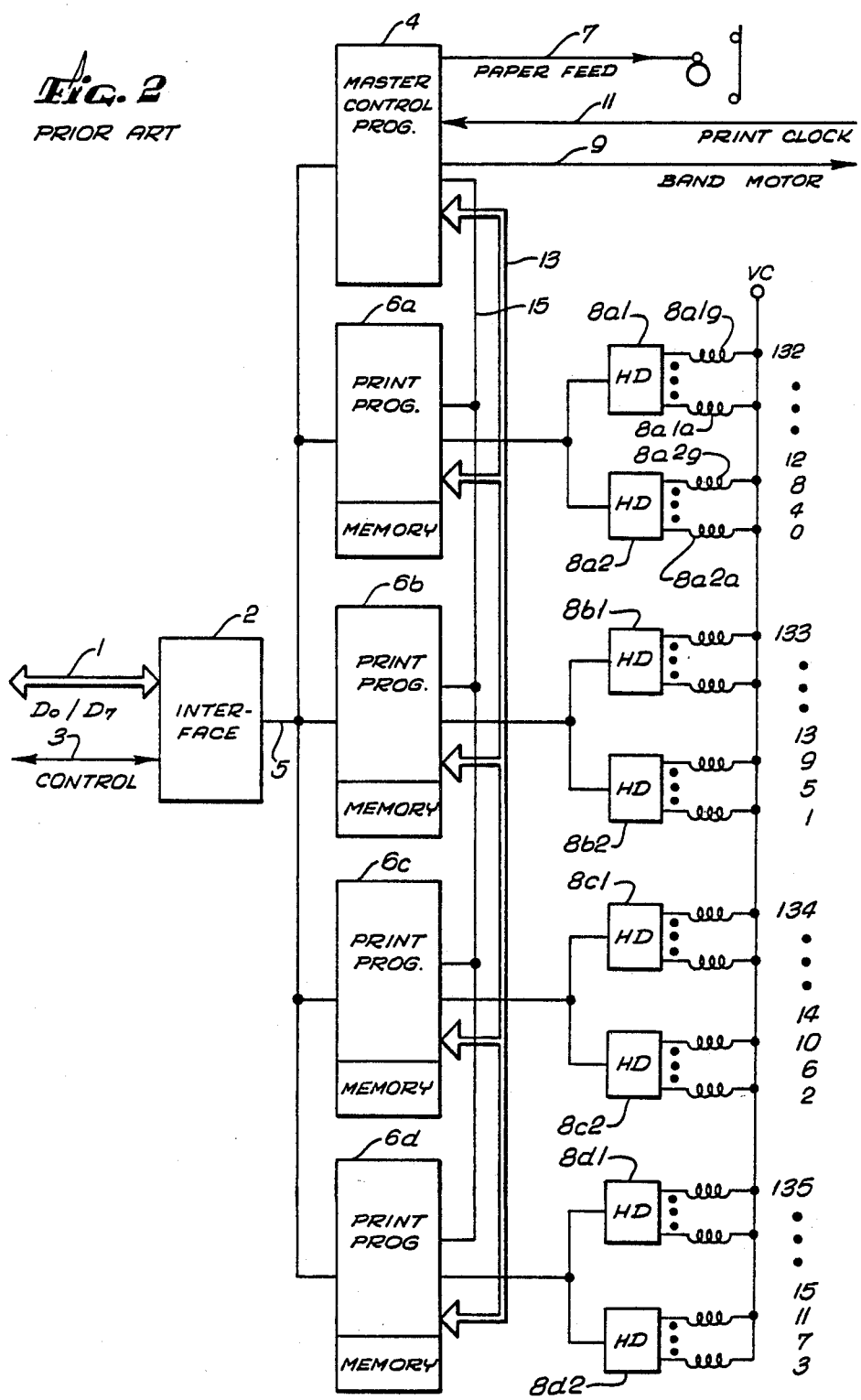
FIG. 2 shows a block diagram of the conventional, prior art, apparatus of a microprocessor-controlled line printer upon which the inventive method of the present invention is implemented.

A portion of a microprocessor-controlled band printer upon which the method of the present invention is implemented is shown as prior art in FIG. 2. Data and interface control signals from an external device, nominally a computer, are respectively received as data signals on D0/D7 bus 1 and as control signals on CONTROL lines 3 into the interface circuitry INTERFACE 2. Received commands are distributed from INTERFACE 2 to MASTER CONTROL PROC. 4, which is nominally of type 8031. The data to be printed is distributed from INTERFACE 2 to PRINT PROC. 6a–d and stored in the memories MEM associated with each PRINT PROC. 6a–d. The MASTER CONTROL PROC. 4 is responsible for controlling the print feeder PF via signal PRINT FEED on line 7. The MASTER CONTROL PROC. 4 also controls the band motor via signal BAND MOTOR on line 9. The MASTER CONTROL PROC. 4 receives the signal PRINT CLOCK, which will be shown in FIG. 2a, on line 11 and will from such signal produce a phased pulse signal distributed via a bus 13 to PRINT PROC. 6a–d in order to inform such print processors that the print cycle has begun. Each of the print processors 6a, 6b, 6c and 6d controls a respective two banks of hammer drivers 8a1,2, 8b1,2, 8c1,2, and 8d1,2. Each of the banks of hammer drivers, for example hammer driver bank HD 8a1, controls 17 print hammers illustrated as inductances, for example, print hammers 8a1a through 8a1q. The other terminal of each of 136 hammer drivers is tied to voltage VC. The 136 print hammers at 136 print positions so controlled are divided into four groups. Each print processor 6a–d is controlling 34 print hammers which reside at every fourth print position.

A primary operation performed on the prior art apparatus shown in FIG. 2 is to map, via an algorithm, the print characters received across INTERFACE 2 and stored in the memory MEM of the PRINT PROC. 6a–d to control the print hammer drivers HD 8a1-8d2. The combined memory in each of the PRINT PROC. 6a–d may be considered a line buffer, containing at one time the complete print characters (nominally 136) for an entire line. The normal mapping of such print characters, nominally in ASCII code, to control of the printer drivers involves (1) keeping track of the position of the characters on the band with a microcomputer, and (2) comparing the data in the print buffer to the current print position in the microcomputer, activating the hammer drivers at each print position when the band has currently rotated to a position placing proximate such hammer driver the character to be printed. When each print processor PRINT PROC. 60a–d has printed all of the characters within its associated memory, and has blanked such memory, then the MASTER CONTROL PROC. 4 is alerted via line 15, which may be wired-OR (collector dotted) between the print processors. When all print processors indicate completion, the line is printed and the master print cycle begins again.

Figure 3A:
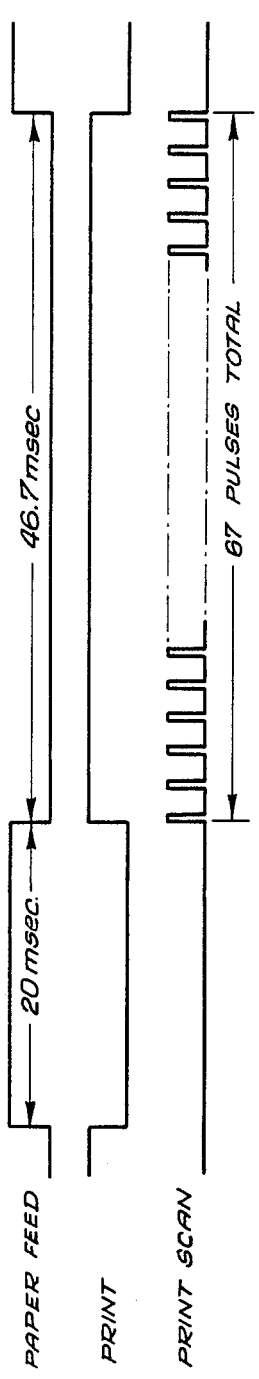
FIGS. 3a and FIG. 3b show timing diagrams of the apparatus of the present invention shown in FIG. 2.
Figure 3B:
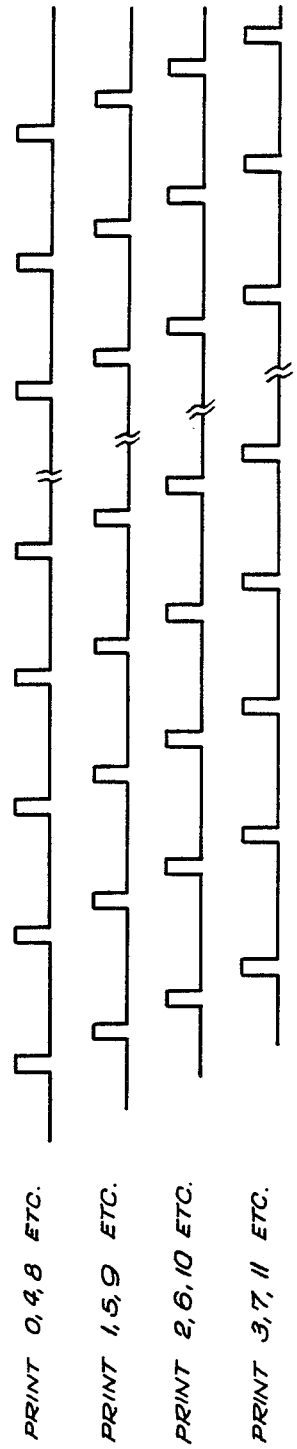

The printer timing during which such a mapping of print characters for control of the print hammer drivers is performed is shown in FIGS. 3a and 3b. The total time of printing one line, or the line cycle time, is shown as the time between which the signal PAPER FEED successively goes high, or true, or that equal time between which the signal PRINT successively goes low, or false. For a 600 line per minute printer, this is 60 seconds divided by 600 lines, or 100 milliseconds per line.

Alternatively, and is illustrated in FIG. 3a, for a 900 line per minute printer it is 60 seconds divided by 900 lines, or approximately 66.7 milliseconds per line. Of this total line cycle time, some 20 milliseconds is used in paper feeding, as shown by the duration of the high level of signal PAPER FEED. The remaining 46.7 milliseconds is used for printing, as shown by the duration of the high condition of signal PRINT. Within the duration of the print time, there are print cycles, or print scans, sufficient to allow for 64 printable characters to rotate past each print head, plus three sync characters, or a total of 67 scan times. Dividing the 46.7 millisecond interval of the print time by the 67 print scan times, shown as signal PRINT SCAN in FIG. 3a, gives a duration for each print scan time of approximately 690 microseconds for a 900-line-per-minute printer. For a 600-lines-per-minute printer a 75 millisecond print time is divided by 67 giving a print scan time of 1.2 milliseconds.

Returning to FIG. 2, and recognizing that the PRINT PROC. 6a–d shown therein are nominally industry microprocessors type 8051, it will be impossible, by a microcoded routine constructed in accordance with the prior art flow chart of FIG. 4 (discussed hereinafter) for a single microprocessor to execute microcode sufficiently quickly to handle the print mapping task for all 136 columns. This is the reason that the task is divided across four microprocessors PRINT PROC. 6a–d operating in parallel, each microprocessor controlling 34 columns. Even four microprocessors are not, however, able to perform the mapping of 136 columns of print characters of 64 different types when such must be printed within an interval of 46.7 milliseconds, meaning 690 microseconds for each print scan time.

It should be incidentally noted that the print scan times are of the timing relationship shown in FIG. 3b as between the four pairs of hammer driver banks 8a; through 8d shown in FIG. 2. In particular, the timing of the print hammers 8a which do print columns 0,4,8, etc. is represented by the signal PRINT 0,4,8, ETC. At a slight phase delay from this signal is the signal causing print hammers 8b to print column 1,5,9, ETC., signal PRINT 1,5,9, ETC. Likewise signals PRINT 2,6,10, ETC. and signal PRINT 3,7,11, ETC. are at successively greater phase delays. This phase delay accounts that no greater than ¼ of the total hammer drivers should be nabled to drive print hammers at any one time (even if an entire line was printable at a single one print scan time by virtue of the characters upon the print band being at proper position for each character to be printed upon the entire line). This is so that the current drawn by the parallel hammer drivers, and the size of the power supply required to produce such current, may be reduced. Additionally, shock and vibration attendant upon simultaneous hammer firings is somewhat abated by the quadrature phasing of such hammer firings illustrated in FIG. 3b. Such control is incidental to the present invention, the important point being only that the print scan time which is that uniform period common to all the waveforms shown in FIG. 3b, will be a short 690 microseconds for printing occurring at 900 lines per minute.

Figure 4:
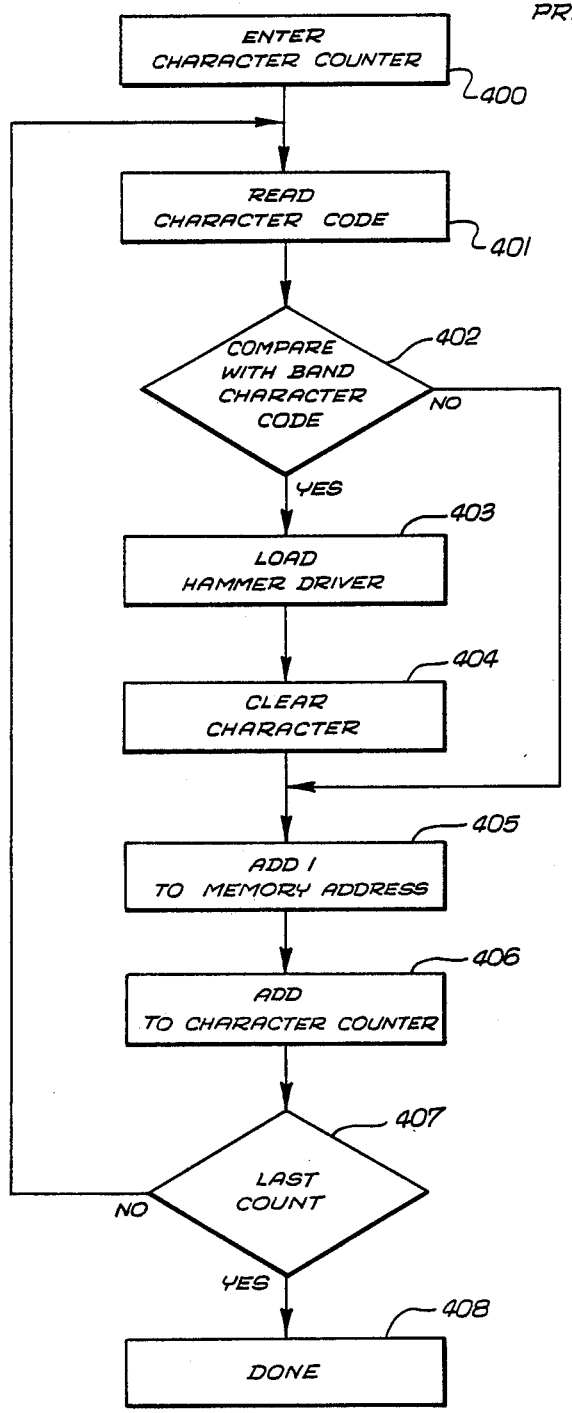
FIG. 4 shows a flow diagram of the prior art algorithm for the performance of mapping of the print characters by microprocessors in a band printer.

A flowchart of the prior art print mapping algorithm performed, which algorithm when performed by four 8051 type printer processors operating in parallel (as shown in FIG. 2) was sufficient to allow the mapping of up to 64 print characters at rates up to 600 lines per minute, is shown in FIG. 4. Performance of the algorithm as flowcharted was entered into at the beginning of the print time, as is illustrated by the high, or true, level of signal PRINT shown in FIG. 3a. The flowcharted routine, normally microcoded, for the control of mapping of print characters is entered at block 300 upon the commencement of print time with the initialization of the character counter. A character code is read from the local portion of the line buffer memory, which portion contains the character codes for the print positions controllable by this microprocessor, in block 401. The read character code is compared with the character of the print band now at the associated one print position. If the characters are equal, than the hammer driver is driven in block 403 and the now-printed character code is cleared from the line buffer memory in line 404. Alternatively, if the character to be printed did not compare with the character now at the print position upon the printer band, a direct path is taken from block 402 to the incrementation of the line buffer memory address in block 405. The character counter is originally incremented in block 406, identifying the print band character now at the next print position controllable by the microprocessor. If one microprocessor is operating, then this character counter will be incremented by one; if two microprocessors are operating each controlling alternate position, the character counter will be incremented by two; if four microprocessors are operating as is illustrated in FIG. 2 with each controlling every fourth print position, then four will be added to the character counter in block 406. In block 407 it is determined whether the entire print buffer has been exhausted. If not, a return to block 401 is affected, or if all line-buffer-contained character codes have been compared to the print band characters now present at each print position controlled by the microprocessor, completion block 408 entered. The entire subroutine will be commenced again on the next minor print cycle, some 1.2 milliseconds later during 600 line-per-minute printing. A type 8051 microprocessor cannot perform the microcode associated with FIG. 4 for the control of 34 print positions each capable of being printed with up to 64 characters during a time period so short as 690 microseconds.

Consequently, a further, improved, algorithm is desired for the more effective mapping by microprocessors of print characters into the control of print hammers of a band printer. The solution of the present invention is based upon reducing the computation required to be done in real time during the print time while printing the line. The solution of the present invention is based on the fact that as soon as the print characters are available from the interface then the time at which such characters will in the future be printed is predictable. These interface print data characters are always loaded to a line buffer during paper moving, or idle, time. Generally the transmission is very fast, and does not require any significant portion of that total paper feed time which is approximately 25 milliseconds for a 600 lines-a-minute printer and 20 milliseconds for a 900 lines-a-minute printer. The improved algorithmic method of the present invention will involve inspecting the print data characters received across the print interface during the remainder of the paper feed period, calculating during this time which one or ones of the characters will be present at the print station upon the first print character time, upon the second print character time, and so on. Each print character time is referred to as a scan time. With this comparison calculation occurring during paper feed time or idle time, the print scan time at which each print character will in the future be printed is determined. At a latter time, during the print time, these stored determinations will be used in a shortened microcontrol loop to actuate the firing of the print hammers. In such a manner, the efficiency of the use of the microprocessors to control the mapping of print characters may be enhanced.

Figure 5:
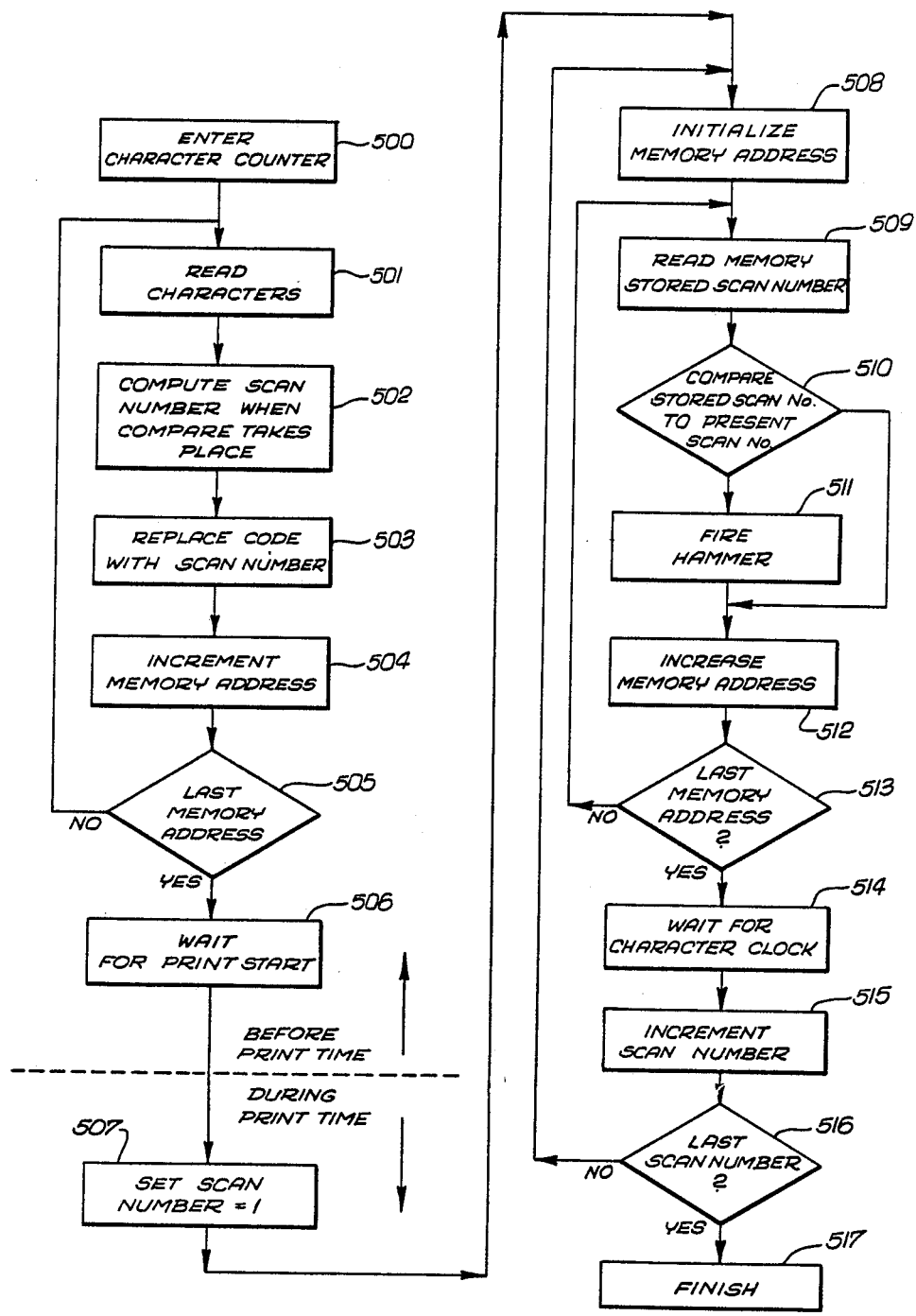
FIG. 5 shows a flow diagram of the improved algorithm for the speeding of the mapping of print characters by microprocessors in a band printer of the present invention.

The flowchart of the algorithmic method of the present invention is shown in FIG. 5. All activity flowcharted above the dotted line in the direction marked BEFORE PRINT TIME is conducted before the high going level of signal PRINT shown in FIG. 3a, and during the high level of signal PAPER FEED. All activity flowcharted below the dotted line in the direction labelled DURING PRINT TIME in FIG. 5 is conducted during the high occurrence of signal PRINT, shown in FIG. 3a. In the part of the algorithmic method performed prior to print time, entrance is made upon the completion of interface input activities at block 500 with the initialization of the address counter to the line buffer memory. A print character is next read from such memory in line 501, and, the future occuring print scan number when a comparison to such character will be true is calculated in block 502. Importantly, it must be understood that such calculations must be undertaken in (1) knowledge of the sequence of the characters upon the print band, and (2) knowledge of the print character upon such band which will appear opposite such print station at the first print scan time at the commencement of the print time. This information is merely a matter of keeping track of sequential activities, and is like, but not identical, as to the management task which was performed by the prior art algorithmic method shown in FIG. 4. Continuing in FIG. 5, upon the calculation of that future scan number at which a print hammer should be actuated to print that corresponding character code upon the band which does correspond to the character code of the line memory, this scan number is replaced in the line memory itself as shown in block 503. The line memory address is next incremented in block 504, and a loop back to repeat of blocks 501–504 is made in block 505 dependent upon whether the last line memory address has been reached. At such time as the last memory address is reached and block 506 is entered, the original print characters of the line buffer memory, which are nominally a total of 136 characters, have been entirely replaced with the corresponding numbers of an upcoming print scan time, numbers 1 through 64 for a 64 character print set. The process waits in block 506 for the beginning of the start of print, which is communicated to the microprocessors by a control signal.

Upon entering the sequence of the algorithmic method of the present invention performed during print time shown at the bottom of FIG. 5, a scan counter is set to 1 in block 507. The address of the line buffer memory, now containing the scan codes, is initialized in block 508. The memory is read for the scan number to print in block 509. For a retrieved scan number from the line buffer memory which compares equal to the current scan number in block 510, the path to block 511 is entered and the print hammer corresponding to the comparing position is fired. If no comparison is obtained, or after firing of the print hammer for a previous position, the address of the line buffer memory (now containing the scan numbers) is increased in block 512. If the last address is not determined to have been reached in block 513, the subroutine is reentered at block 509 and the next memory location is read for its stored scan number. This next stored scan number will be compared with the same present scan number until that time upon which the total addresses of the scan memory have been read. Upon determination in block 513 that the last memory address has been reached, the algorithmic method of the present invention will pause in block 514 waiting for the next character clock. Upon receipt of the character clock, the present scan number is incremented in block 515. If this is not the last scan number, i.e., scan number 64 in a 64 character band, then the routine is re-entered at block 508 and repeated. When the last scan number is reached the print algorithm terminates in block 517. At such time each character, of a nominal 64 possible characters, will have been printed at the print positions controlled by the microprocessor, nominally 34 print positions in accordance with the physical apparatus diagrammed in FIG. 2.

The specific microcode which does accomplish the method of the present invention on an Intel 8051 series microprocessor is contained in Appendices A and B. Appendix A contains the microcode performing that portion of the algorithm of the present invention which is flowcharted above the dotted line shown in FIG. 5, and Appendix B contains the microcode performing that portion of the algorithm of the present invention which is flowcharted below the dotted line shown in FIG. 5. The only external reference needed to clearly interpret such microcode is a reference to the numerical organization of the line buffer memory. Such organization and use of the addresses of the line buffer memory is diagrammatically illustrated in FIG. 6.

A summary diagram of the operation of the present invention is shown in FIG. 7. A TEXT INPUT, for example "NOW IS THE TIME", originally received in character code, such as ASCII code, is converted, for each position in the print line which such text occupies, into a corresponding ASSIGNED SCAN TIME. Importantly, all this conversion transpires during the PAPER FEED interval of the overall TIMING of the printer. Then, upon entering the PRINTING interval of the overall PRINT TIMING, of each current scan time within such PRINTING interval then for each and every of the stored scan times which equals the current scan time the corresponding print hammer(s) are fired, or energized, in order to then print the then proximately opposite character font upon the print band. This is illustrated in FIG. 7 for only the first such firing, which is to FIRE HAMMERS AT POSITIONS 2 AND 9 at scan time 3. By references to the scan time encoding of the original method this will be observed to print the "O" at print position 2 simultaneous to printing the "H" at print position 9. Hammer firings continue until the entire line is printed at all pertinent positions.

The advantages of the improved algorithmic method of the present invention will be perceived to be that it does allow the use of lower cost, slower, integrated circuit microprocessor components to do what would elsewise have to be performed by faster, and/or more numerous microprocessor components or even more expensive dedicated hardware. Once the concept of the present invention to distribute the function performed in the mapping of the print characters to control of the print hammers in a band printer by microprocessors is recognized, alternative implementation of the microcode control flowcharted in FIG. 5, and alternative implementations and petitionment of the hardware resource to that illustrated in FIG. 2, would be apparent to a practitioner in the art of designing microprocessor-based digital control logic. Consequently, the present invention should be assessed by the language of the claims as follows, and not by the particular structure of the preferred embodiment context within which such invention has been taught.

Appendix A

```
        ;WAIT FOR PHASING PULSE
        ;-----------------------

INTPRT: CLR     P3.1            ;BUSY LEVEL TO MPM

MOV     R3,#03          ;SET RECOVERY PULSE COUNTER

LMH:    MOV     R1,#5EH         ;GET DATA STARTING ADDRESS
        MOV     21H,#00H        ;INITIAL SCANE # OFFSET
LMH0:   CJNE    @R1,#0FFH,LMH0A ;SKIP IF DATA IS 0FFH
        JMP     LMH1A
LMH0A:  MOV     A,@R1           ;GET DATA INTO ACC
        CLR     C               ;CLEAR C-FLAG
        SUBB    A,21H           ;DATA - OFFSET = SCANE #
        JNC     LMH1            ;IF < 0
        ADD     A,#40H          ;ADD 64 BACK
LMH1:   MOV     @R1,A           ;CHANGE DATA INTO SCANE NUMBER
LMH1A:  INC     R1              ;NEXT DATA
        CJNE    R1,#80H,LMH2    ;NO > 34 LOCATIONS
        JMP     PRINT           ;FINISHED SCANING
LMH2:   MOV     A,21H           ;GET SCANE # INTO ACC
        ADD     A,#03           ;UPDATE SCANE OFFSET
        CJNE    A,#40H,LMH3     ;CHECK FOR WRAP AROUND
LMH3:   JC      LMH4            ;NO WRAP AROUND
        ANL     A,#03           ;MASK OUT FOR WRAP AROUND
LMH4:   MOV     21H,A           ;UPDATE SCANE OFFSET NUMBER
        JMP     LMH0
```

```
;SCAN BUFFER FOR PRINT DATA (600 LPM)
;------------------------------------

PR5:    MOV     21H,@R1         ;(HMR BUFFER) TO ADDRESS 21
        MOV     A,@R0           ;(DATA BUFFER) TO A

PR6:    CJNE    A,#0FFH,PR7     ;IF A IS NOT FF, SET DATA FLAG
        JMP     PR9

PR7:    CJNE    A,22H,PR8       ;IF COMPARE, THEN DO

JB      42H,PR8
        INC     28H             ;HAMMER LIMIT MINUS 1

ANL     21H,#0F3H       ;ARM HAMMER = 1111 1011
        MOV     @R0,#0FFH       ;CLEAR CODE FROM BUFFER
        JMP     PR9

PR8:    SETB    03H             ;SET DATA FLAG
PR9:    INC     R0              ;STEP DATA BUFFER ADDRESS
PR11:   MOV     A,@R0           ;A = (DATA BUFFER)
PR12:   CJNE    A,#0FFH,PR13    ;IF A IS NOT FF, THEN SET DATA FLAG
        JMP     PR15

PR13:   CJNE    A,22H,PR14      ;IF COMPARE, THEN DO

JB      42H,PR14
        INC     28H             ;HAMMER LIMIT MINUS 1

ANL     21H,#3FH        ;ARM N + 1 HAMMER = 10 1 1111
        MOV     @R0,#0FFH       ;CLEAR CODE FROM BUFFER
        JMP     PR15

PR14:   SETB    03H             ;SET DATA FLAG

PR15:   MOV     @R1,21H         ;STORE HMR REG IN HMR BUFFER
        INC     R1
        INC     R0
        CJNE    R0,#80H,PR5     ;SCAN TILL ALL DATA BUFFER DON
```

What is claimed is:

1. A method for controlling printing of a line of text by a band printer which advances paper during a paper feed time interval, said method comprising the steps of:

assigning, during the paper feed time interval preceding said printing of said line of text, to each character at each character location in the line of text to be printed a "scan time" value corresponding to the time, during the printing of said single line of test, at which the print band character font coresponding to that particular each character will be present at the corresponding character location; and firing, at each print scan time during the printing following said paper feed interval, the print hammers at all character locations to which have been assigned that particular "scan time" value.

2. A method of mapping characters to be printed by a band printer comprising:

calculating in at least one microprocessor from received character codes for each print position a future print scan time number at which a corresponding printable character upon a circulating print band will be positioned at said each print position;

storing in a memory said calculated future print scan time number for said each print position; and upon each current print scan time reading from said memory said calculated future print scan time number for each said print position, comparing in said at least one microprocessor each said calculated future print scan time number to the number of the current print scan time, and for each said print position for which the numbers are comparing equal causing printing of the printable character upon said circulating print band then positioned at said each print position.

3. The method according to claim 2 wherein said calculating and said storing are performed entirely during the feeding of paper in said printer and prior to a first print scan time.

4. An algorithmic method performed by microprocessors on information for the purpose of controlling printing in, and of, a band printer; said information including character codes representing characters to be printed at each print position, a fixed sequence of printable characters upon a print band circulating upon print scan times through said each print position, and the one of said printable characters which is positioned at said each print position upon a first said print scan time; said controlling printing including activating a print hammer in order to print at a corresponding print position upon a one print scan time that one character from said printable characters upon said circulating print band which is positioned oppositely said print position and said print hammer; said algorithmic method comprising:

calculating for each said print position a number of that single one print scan time upon which a printable character upon said circulating print band corresponding to that character to be printed at said print position will be positioned oppositely said print position;

storing said number for each said print position; and reading upon each print scan time a stored said number for each said print position, and activating a print hammer at each said print position wherein stored said number is equal to the number of the current print scan time.

5. The algorithmic method of claim 4 wherein said calculating further comprises:

calculating during the feeding of paper in said printer prior to said first print scan time; and wherein said storing further comprises:

storing during said feeding of paper.

6. An improvement to the method of mapping by microprocessors in a band printer a character code representing a character printable at a print position upon a print line into control of a print hammer at said print position in order to, upon a single one print scan time of a multiplicity of print scan times, strike a one printable character upon a rotating print band having many printable characters, thereby printing said character at said print position, said improvement to the method of mapping comprising:

at a time before any of said multiplicity of print scan times, and with knowledge of (1) the sequence of printable characters upon said print band, and (2) the single one of all said printable characters upon said print band which will be positioned at said print position upon a first print scan time of said multiplicity of print scan times, calculating and storing for each character code at a print position the number of that single one print scan time at which that printable character corresponding to said each character code will be positioned at said print position; and during, and upon, each of said multiplicity of scan times, reading said stored number and comparing it to the number of the current print scan time, further controlling an associated said print hammer to strike an oppositely positioned one character on said print band if said comparing is equal, else doing nothing with said print hammer.

7. An improvement to the method of mapping by at least one microprocessor within a band printer a number A of received character codes each representing a one of a maximum number B different printable characters into control of A print hammer at and associated wth A columnar print positions positioned oppositely a circulating print band possessing B different character fonts, corresponding to the B different printable characters, replicated number C times, $B \times C \geq A$, upon number D print scan times, $D = B$, in order that A characters may be printed at the A columnar print positions upon the D print scan times, at a time before any of said D print scan times, and with knowledge of (1) the sequence of said B different character fonts upon said circulating print band and of (2) the single one of said B different character fonts which is upon the first one of said D print scan times positioned in front of each individual one of said A print hammers, computing and storing for each of said A print positions that numbered one of said D print scan times at which that one of said B different character fonts upon said circulating print band corresponding to a one character which is to be printed at each of said A print positions by a one of said A print hammers will be, by circulation of said print band, positioned oppositely each of said A positions; and during, and upon, each of said D print scan times, reading that numbered one of said D print scan times which is stored for each of said A print positions and, for each of said A print positions for which the read numbered one of said D print scan times which was stored compares equal to the current one of said D print scan times, controlling the associated one of said A print hammers in order that a character corresponding to a character font upon said circulating print band then positioned oppositely thereto may be printed.

8. The method of claim 7 wherein:

$A = 136$;
$B = 64$;
$C = 7$;
$D = 67$;

thereby the number of received characters codes equalling the number of print hammers equalling the number of columnar print positions equal 136;

thereby the number of different printable characters equalling the number of different characters fonts equals 64;

thereby the number of replications of the 64 characters fonts upon the print band equals 7;

thereby the number of print scan times equals 67;

thereby $B \times C \geq A$ means $64 \times 7 \geq 136$;

thereby $D \geq B$ means $67 \geq 64$.

9. In a band printer having a line buffer containing a first multiplicity of character codes corresponding to a like first to be multiplicity of characters to be printed which are compared by at least one microprocessor to the positions of a second multiplicity of character fonts upon a print band in order that a first multplicity of print hammers at a first multiplicity of print positions should be actuated at appropriate times to print a line, an improved method of comparing in microprocessors the first multiplicity of character codes to be printed to the positions of the second multiplicity of character fonts upon the print band, said method comprising:

in the time before the printing of each line during the feeding of a workpiece form, and with knowledge of the sequence of character fonts upon the print band and of the single character font of the print band first appearing at each print position upon start of print, computing, by comparing in at least one microprocessor the first multiplicity of character codes to be printed to the print band sequence of character fonts and to the character font first appearing at each print position upon start of print, scan numbers at which each character font of the print band corresponding to a character code to be printed will appear at a the print position whereat said each character corresponding to said character code is to be printed; and storing in a memory the computed said scan numbers; then during the time of printing, upon each successive scan, reading to at least one microprocessor all stored said scan numbers, comprising in said at least one microprocessor each read said scan number to the number of the current scan, and causing by said at least one microprocessor that printing should occur upon each successive scan by actuation of ones of said first multiplicity at print hammers at all print positions wherein the stored scan number compares equal to the number of the current scan.

10. In a band printer printing one of a first multiplicity of characters at each of a second multiplicity of print positions having a line buffer for containing a second multiplicity of character codes, representative of ones of said first multiplicity of characters, to be printed at a second multiplicity of print positions;

a second multiplicity of print hammers each individually selectively actuable for printing during one print scan time upon a workpiece paper a one proximately juxtaposed character font of and upon a print band;

a circulating print band having a first multiplicity of printable character fonts for, upon a first multiplicity of print scan times, successively juxtaposing each said first multiplicity of printable character fonts proximate each said second multiplicity of print hammers;

a microprocessor for comparing said second multiplicity of character codes to be printed at said second multiplicity of print positions to the printable caracter fonts of said circulating print band which are proximately juxtaposed relative to each said second multiplicity of hammers upon successive print scan times, and for causing actuation of such ones of said second multiplicity of hammers as have proximately juxtaposed relative thereto that printable character font which said character code does represent should be printed at each of said second multiplicity of print positions; and an improvement to the method of said comparing and said causing by said microprocessor comprising:

comparing in the time before printing said second multiplicity of character codes to the sequential character fonts of said print band as will sequentially appear at each of said second multiplicity of print positions during the successive scan times of printing;

storing in a memory that unique scan time at which a printable character font on said print band equivalent to that character code for a particular print position will appear at that print position; and causing actuation of all hammers which, upon each scan time of the successive scan times of printing, are associated with a stored said unique scan time which is identical to said each scan time.

11. In a band printer apparatus having:

a line buffer for storing print character codes for print positions, print hammers defining print positions upon a line, a print band circulating printable characters through said print positions, a mechanism for advancing a workpiece paper form, a microprocessor for controlling said line buffer, print hammers, print band, and mechanism in order to effectuate line-at-a-time printing, wherein said mechanism is controlled for advancing during a first time interval called paper feed time, wherein said line buffer, print hammers, and print band are controlled for printing upon cycles during a second time interval called print time, an improvement to said microprocessor for controlling comprising:

a microprocessor for, additionally controlling said mechanism for advancing, during said paper feed time comparing said print character codes within said line buffer to printable characters upon said print band, with knowledge of both the sequence of printable characters upon said print band and also the individual one printable character upon said print band which will first appear at each said print positions at the commencement of print time, and replacing in said line buffer each said print character code with a corresponding one cycle code representing the cycle at which an individual one printable character corresponding to the character desired to be printed will occupy corresponding said print position, and for during said print time causing, at each successive cycle thereof, control of said print hammers in respect of each said cycle code stored in said line buffer for each said print position.

* * * * *